US012658023B2

(12) United States Patent (10) Patent No.: US 12,658,023 B2
Esaka (45) Date of Patent: Jun. 16, 2026

(54) LINKED NOTIFICATION SYSTEM, PORTABLE COMMUNICATION DEVICE, AND LINKED NOTIFICATION METHOD FOR PORTABLE COMMUNICATION DEVICE

(71) Applicant: MAXELL, LTD., Kyoto (JP)

(72) Inventor: Fumiaki Esaka, Kyoto (JP)

(73) Assignee: Maxell, Ltd., Kyoto (JP)

( * ) Notice: Subject to any disclaimer, the term of this patent is extended or adjusted under 35 U.S.C. 154(b) by 0 days.

(21) Appl. No.: 18/035,317

(22) PCT Filed: Nov. 5, 2020

(86) PCT No.: PCT/JP2020/041345
§ 371 (c)(1),
(2) Date: May 4, 2023

(87) PCT Pub. No.: WO2022/097224
PCT Pub. Date: May 12, 2022

(65) Prior Publication Data
US 2023/0410637 A1     Dec. 21, 2023

(51) Int. Cl.
*G08B 25/01* (2006.01)
*G06F 21/32* (2013.01)
(52) U.S. Cl.
CPC ........... *G08B 25/016* (2013.01); *G06F 21/32* (2013.01)
(58) Field of Classification Search
CPC .. G08B 25/016; G08B 15/005; G08B 15/004; G06F 21/32; H04M 1/72409; H04M 1/72424
(Continued)

(56) References Cited

U.S. PATENT DOCUMENTS 8,049,597 B1 * 11/2011 Murakami ............. G06V 40/10
340/5.1
2011/0003601 A1 * 1/2011 Coutts .................... H04M 11/04
455/550.1
(Continued)

FOREIGN PATENT DOCUMENTS

JP       07-079294 A      3/1995
JP       H0779294       *  3/1995
(Continued)

OTHER PUBLICATIONS

Japanese Office Action received in corresponding Japanese Application No. 2022-560559 dated Dec. 3, 2024.
(Continued)

*Primary Examiner* — Omar Casillashernandez
(74) *Attorney, Agent, or Firm* — Mattingly & Malur, PC

(57) ABSTRACT

In a linked notification system configured by communication-connecting at least one external device to a portable notification device, on receipt of a state signal indicating a state of the external device from the external device, the portable notification device refers to the notification control information in which a notification destination is associated with a notification condition defined by using a state of the external device, and determines whether the notification condition is satisfied or not on the basis of the state signal. When it is determined that the notification condition is satisfied, the portable notification device notifies the notification destination associated with the notification condition.

14 Claims, 12 Drawing Sheets

1a

(58) Field of Classification Search
USPC .................................................... 340/539.11
See application file for complete search history.

(56) References Cited

U.S. PATENT DOCUMENTS

| | | | |
|---|---|---|---|
| 2017/0206763 A1 | 7/2017 | Scully et al. | |
| 2018/0040230 A1 | 2/2018 | Benoit et al. | |
| 2019/0110181 A1* | 4/2019 | Kavantsaari | G08B 25/001 |
| 2019/0149661 A1* | 5/2019 | Klaban | H04M 7/0075 |
| | | | 379/45 |

FOREIGN PATENT DOCUMENTS

| JP | 2003-006762 A | | 1/2003 |
|---|---|---|---|
| JP | 2005-309490 A | | 11/2005 |
| JP | 2010-278962 A | | 12/2010 |
| JP | 2010278962 | * | 12/2010 |
| JP | 2016-050703 A | | 4/2016 |
| JP | 2016050703 | * | 4/2016 |
| JP | 2016-092658 A | | 5/2016 |
| JP | 2019-050493 A | | 3/2019 |
| JP | 2019050493 | * | 3/2019 |
| JP | 2020-13334 A | | 1/2020 |
| JP | 2020-025343 A | | 2/2020 |

OTHER PUBLICATIONS

Extended European Search Report received in corresponding European Application No. 20960777.9 dated Jun. 25, 2024.
International Search Report of PCT/JP2020/041345 dated Jan. 19, 2021.

* cited by examiner

| | EXTERNAL DEVICE 1 | EXTERNAL DEVICE 2 | SENSOR 1 | SENSOR 2 | A N D O R | NOTIFICATION DESTINATION / CONTENT ADDITIONAL INFORMATION |
|---|---|---|---|---|---|---|
| 1 | STATE 1 | STATE A | THRESHOLD OR LARGER | Don't Care | A N D | A / x ... |
| 2 | STATE 1 | STATE B | Don't Care | THRESHOLD OR LARGER | A N D | B / x ... |
| 3 | STATE 2 | STATE A | THRESHOLD OR LARGER | THRESHOLD OR LARGER | A N D | C / y ... |
| 4 | STATE 2 | STATE C | Don't Care | Don't Care | A N D | A / y ... |
| 5 | Don't Care | Don't Care | THRESHOLD OR LARGER | THRESHOLD OR LARGER | O R | B / x ... |
| | | | | | | |

LINKED NOTIFICATION SYSTEM, PORTABLE COMMUNICATION DEVICE, AND LINKED NOTIFICATION METHOD FOR PORTABLE COMMUNICATION DEVICE

TECHNICAL FIELD

The present invention relates to a linked notification system using a portable communication device (portable notification device), a portable communication device, and a linked notification method for a portable communication device and, particularly, to a linked notification system, a portable communication device, and a linked notification method for a portable communication device, sending a notification from a portable notification device in accordance with an operation state of an external device.

BACKGROUND ART

Patent Literature 1 discloses a portable terminal device "including: an impact unit provided so that it can be either housed on one side of a case body housing the body of the portable terminal device or projected, and generating high current by amplifying electric energy supplied from a power supply unit provided for the case body; an operation unit operating the impact unit in an emergency situation; a multimedia unit collecting sounds or images of a situation when the impact unit is operated by the operation unit; and a communication unit, at the time of operation of the impact unit, transmitting the present position of the portable terminal device to a specified organization together with the sounds or images collected by the multimedia unit (abstract)".

CITATION LIST

Patent Literature

Patent Literature 1: Japanese Unexamined Patent Application Publication No. 2016-92658

SUMMARY OF INVENTION

Problem to be Solved by Invention

According to Patent Literature 1, the present position, sounds, and images can be transmitted to a specified organization in accordance with an operation state of a self-defense item. Since the information can be automatically transmitted at the time of facing a danger, reassurance is obtained. However, since a notification destination and a situation that the user desires to send a notification vary depending on the situation of the user, there is a demand to freely set them. This point is not considered in Patent Literature 1.

The present invention has been made in consideration of the above-described circumstances and an object of the present invention is to provide a linked notification system, a portable communication device, and a linked notification method for a portable communication device, capable of sending a notification in reflection of the operation state of an external device fitted to a situation.

Solution for Problem

In order to solve the problem, the present invention has configurations described in the scope of claims. As an example, the present invention relates to a linked notification system configured by communication-connecting at least one external device to a portable notification device. The portable notification device includes a first processor, a nonvolatile memory, a first communication device performing communication with the external device, and a notification device sending a notification to a predetermined notification destination. Each of the external devices has a second communication device performing communication with the portable notification device. The nonvolatile memory stores notification control information in which a notification destination is associated with a notification condition defined by using a state of the external device. The first processor, on receipt of a state signal indicating a state of the external device from the external device, refers to the notification control information and determines whether the notification condition is satisfied or not on the basis of the state signal. When it is determined that the notification condition is satisfied, the first processor executes control for sending a notification to a notification destination associated with the notification condition on the notification device.

Effects of Invention

According to the present invention, a linked notification system, a portable communication device, and a linked notification method for a portable communication device, capable of sending a notification in reflection of an operation state of an external device fitted to a situation can be provided. The other objects, configurations, and effects will become apparent by the following description of embodiments.

BRIEF DESCRIPTION OF DRAWINGS

FIG. 9 is a diagram illustrating a control table stored in a smartphone in the second embodiment.

DESCRIPTION OF EMBODIMENTS

Figure 1:
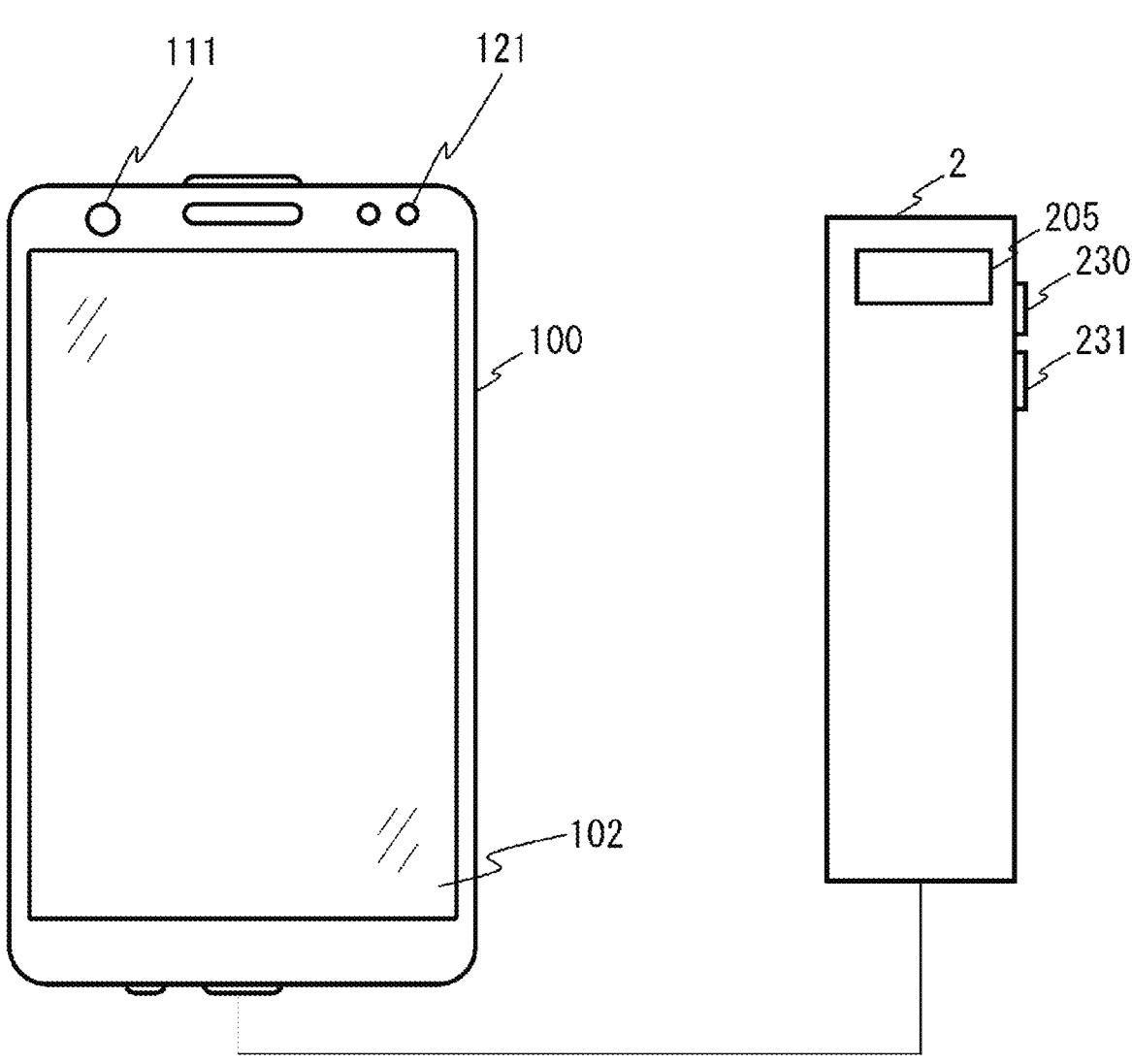
FIG. 1 is a schematic diagram of a linked notification system according to a first embodiment.

Hereinafter, preferred embodiments of the present invention will be described with reference to the drawings. In all of the drawings, the same reference numeral is designated to the same configuration and repetitive description will not be given.

First Embodiment

A first embodiment relates to a linked notification system connecting a portable notification device and an external device in a one-to-one manner and sending a notification to a predetermined notification destination from the portable notification device in accordance with the state of the external device. An "external device" refers to a device different from a portable notification device. Further, the point that a portable notification device is provided with functions of restricting operation of an external device and cancelling the restriction is also one of the features of the embodiment.

FIG. 1 is a schematic diagram of a linked notification system 1a according to the first embodiment.

The linked notification system 1a according to the first embodiment uses a self-defense tool 2 having an electric shock function as an external device and is configured by connecting the self-defense tool 2 to a smartphone 100 as a portable notification device by wire. A notification from the smartphone 100 to a specified notification destination, for example, the police is used as a condition of cancelling the operation restriction of the self-defense tool 2.

Hardware used as a portable notification device is not limited to the smartphone 100 as long as it is a portable terminal device having functions of determining whether a notification condition is satisfied and sending a notification when the notification condition is satisfied (hereinbelow, called a "linked notification function"). For example, by installing application software which can execute the linked notification function in a portable electronic book device or a portable music player having a communication function, it can be also used as the portable notification device.

The smartphone 100 has, in a front face of the casing, a display 102, an in-camera 111, and a microphone 121.

The self-defense tool 2 has a display 205 on the front face of the casing and has, on a side face, a power button 230 and a pulse button 231 receiving an output operation of a high-voltage pulse. Although the self-defense tool 2 is illustrated as a separate member connected to the smartphone 100 by a wire in FIG. 1, it may have a shape of the cover of the smartphone like in Patent Literature 1.

Figure 2:
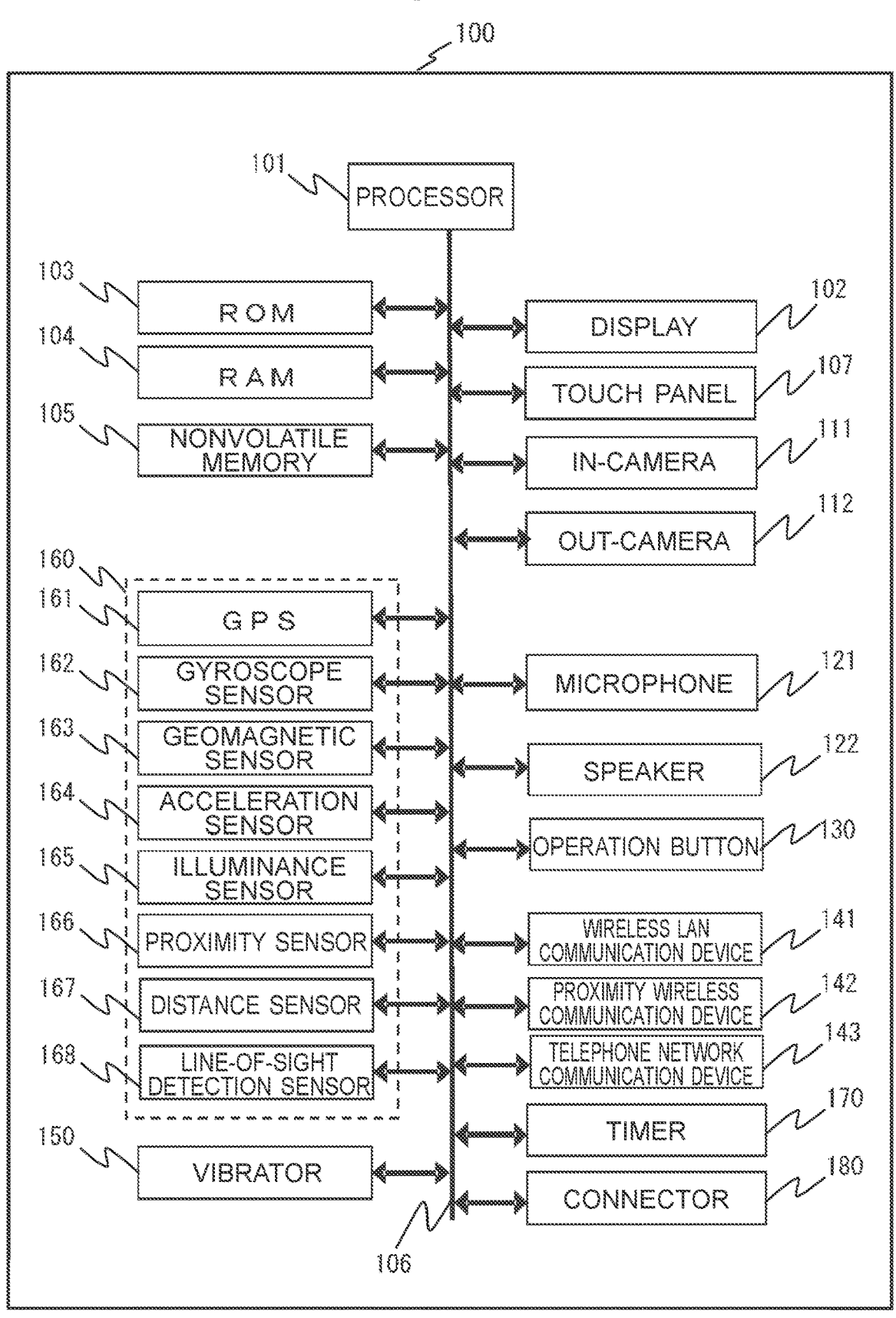
FIG. 2 is a hardware configuration diagram of a smartphone.

FIG. 2 is a hardware configuration diagram of the smartphone 100.

The smartphone 100 has a processor 101 (corresponding to a first processor) made by a CPU and an MPU, the display 102, a ROM 103, a RAM 104, a nonvolatile memory 105, a touch panel 107 (corresponding to an operation member) stacked on the display 102, the in-camera 111, an out-camera 112, the microphone 121, a speaker 122, an operation button 130 (corresponding to an operation member), a wireless LAN communication device 141 (for example, a communication device conformed to the Wi-Fi (registered trademark) standard), a proximity wireless communication device 142 (for example, a communication device conformed to the Bluetooth (registered trademark) standard), a telephone network communication device 143 (for example, a communication device conformed to the LTE, 4G, or 5G standard and corresponding to a "notification device"), a vibrator 150, a sensor group 160, a timer 170, and a connector 180, which are connected to one another via a bus 106. The connector 180 may be, for example, a connector conforming to various USB standards and is used in the case of connecting the self-defense tool 2 by wire. In the embodiment, since the smartphone 100 and the self-defense tool 2 are connected by wire via the connector 180 and a connector 280 (refer to FIG. 3), the external interfaces such as the connectors 180 and 280 correspond to a first communication device and a second communication device, respectively.

The sensor group 160 includes a GPS sensor 161 (corresponding to a position sensor), a gyroscope sensor 162, a geomagnetic sensor 163, an acceleration sensor 164, an illuminance sensor 165, a proximity sensor 166, a distance sensor 167, and an eye-gaze detection sensor 168.

The operation button 130 includes a power button and a sound volume button provided on side faces of a casing 108.

Figure 3:
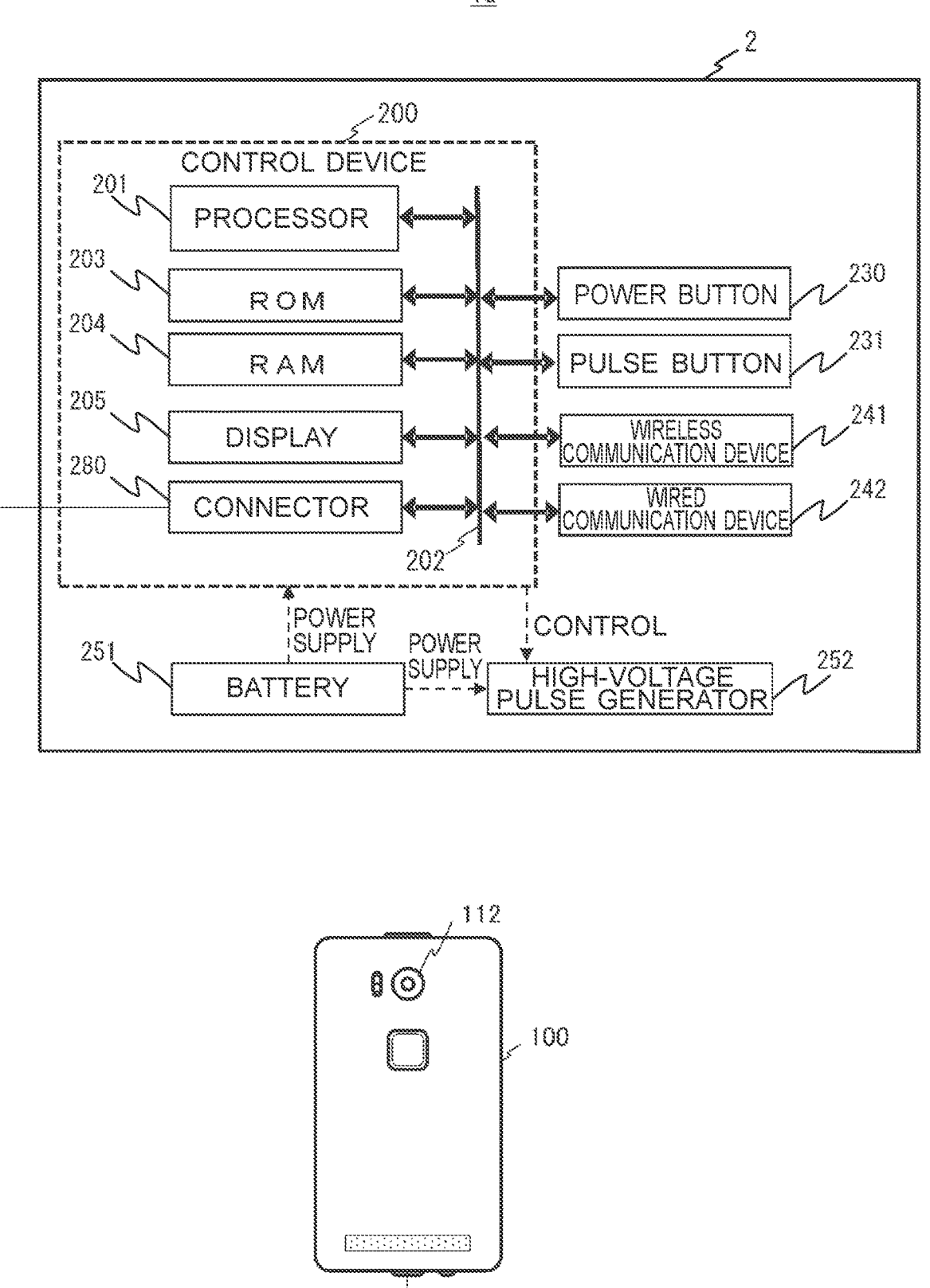
FIG. 3 is a hardware configuration diagram of a self-defense tool.

FIG. 3 is a hardware configuration diagram of the self-defense tool 2. The smartphone 100 in FIG. 3 illustrates its back side.

The self-defense tool 2 houses, in the casing, a control device 200, a battery 251, and a high-voltage pulse generator 252. In response to a press on the pulse button 231, the control device 200 outputs a pulse generation signal to the high-voltage pulse generator 252. The battery 251 supplies power to each of the control device 200 and the high-voltage pulse generator 252.

In the control device 200, a processor 201 (corresponding to a second processor), a ROM 203, a RAM 204, a display 205, and the connector 280 are connected to one another by a bus 202. To the control device 200, any of a power button 230, the pulse button 231, a wireless communication device 241, and a wired communication device 242 may be connected.

Figure 4:
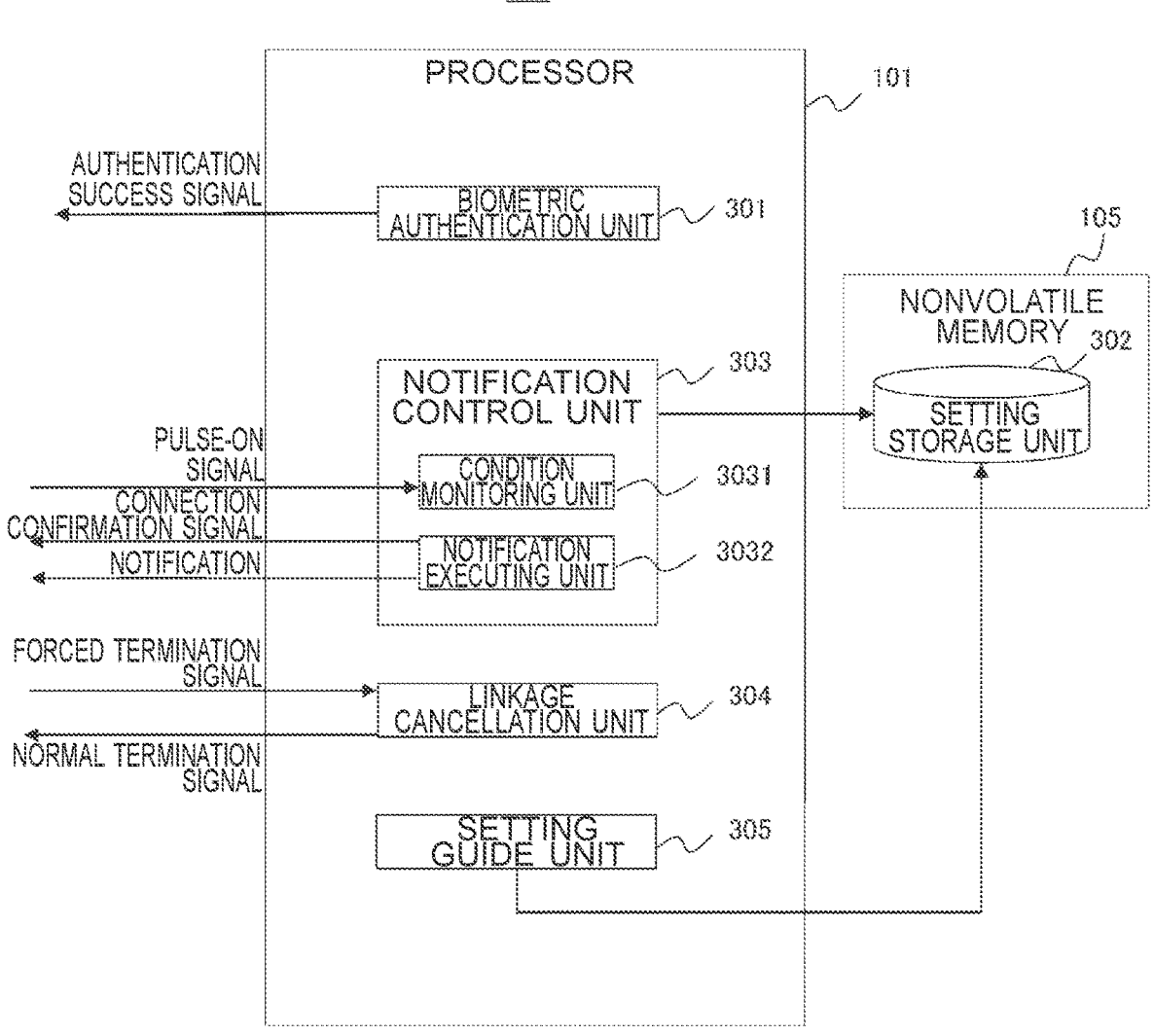
FIG. 4 is a functional block diagram of a notification control application which is installed in a smartphone.

FIG. 4 is a functional block diagram of a notification control application 300 which is installed in the smartphone 100. The notification control application 300 is stored in the nonvolatile memory 105 of the smartphone 100, loaded to the RAM 104, and executed by the processor 101. The notification control application 300 edits and reads a notification control table 500 in a setting storage unit 302 configured in a region in the nonvolatile memory 105.

The notification control application 300 has functions of a biometric authentication unit 301, a notification control unit 303, a linkage cancellation unit 304, and a setting guide unit 305. The notification control unit 303 includes a condition monitoring unit 3031 and a notification executing unit 3032.

Figure 5:
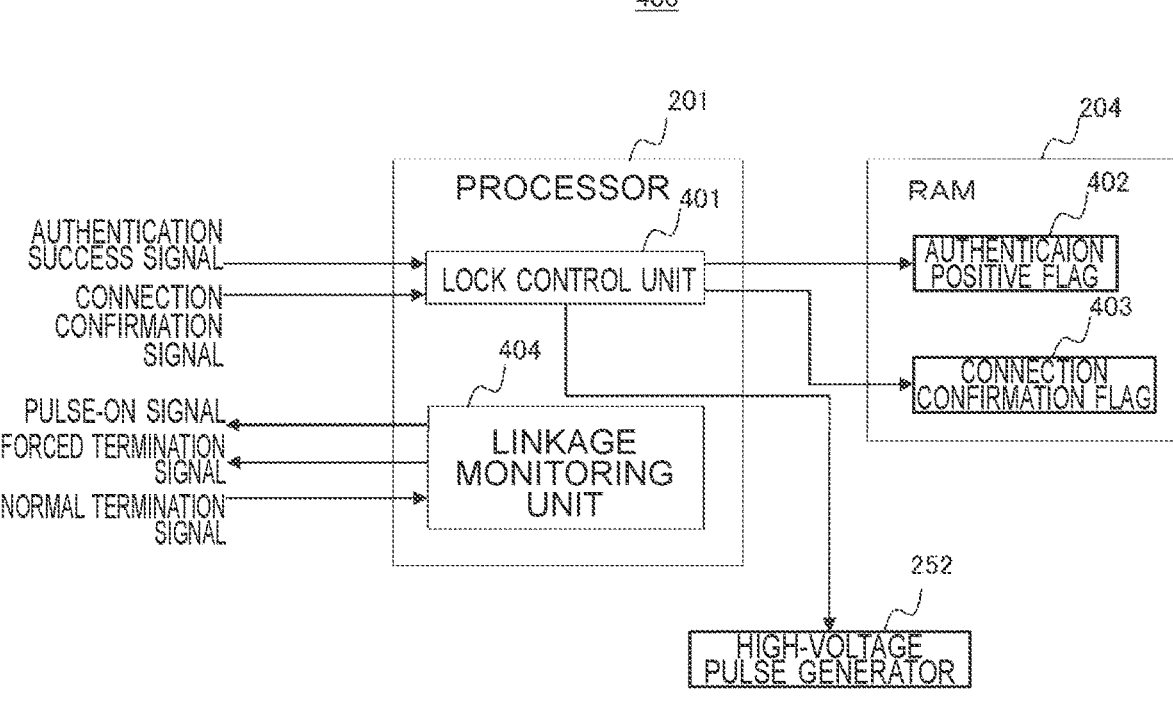
FIG. 5 is a functional block diagram of a use lock application which is installed in a self-defense tool.

FIG. 5 is a functional block diagram of a use lock application 400 which is installed in the self-defense tool 2. The use lock application 400 is stored in the ROM 203 in the self-defense tool 2, loaded to the RAM 204, and executed by the processor 201. The use lock application 400 writes data to and reads it from a storage region in an authentication positive flag 402 and a storage region in a connection confirmation flag 403. Both the storage region in an authentication positive flag 402 and the storage region in a connection confirmation flag 403 is configured in a region in the RAM 204.

The use lock application 400 has a lock control unit 401 and a linkage monitoring unit 404.

Figure 6:
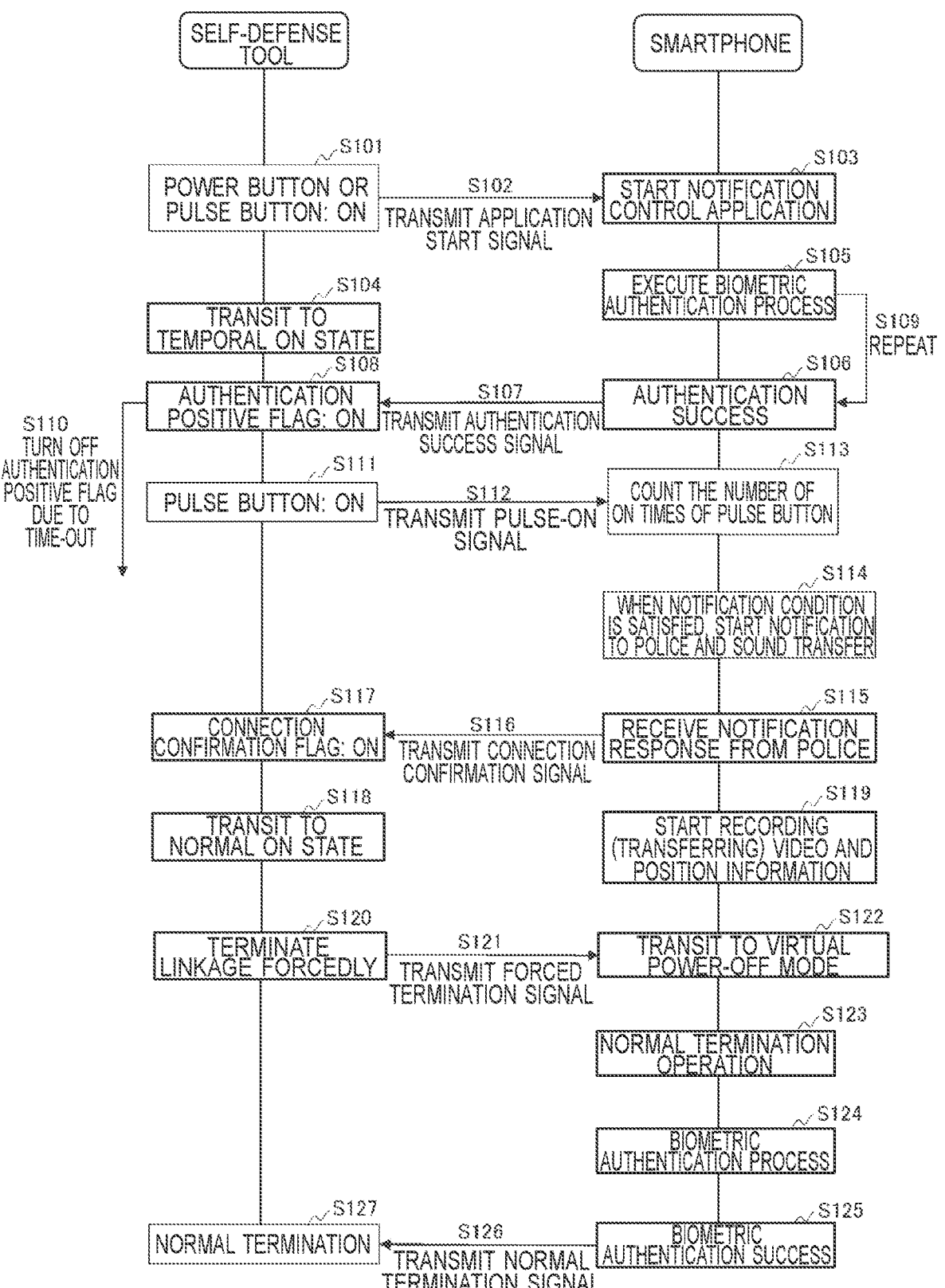
FIG. 6 is a sequence diagram illustrating the flow of control of the linked notification system according to the first embodiment.

FIG. 6 is a sequence diagram illustrating the flow of control of the linked notification system 1a according to the first embodiment.

When the power button 230 of the self-defense tool 2 is turned on or the pulse button 231 is pressed (S101), the use lock application 400 of the self-defense tool 2 starts and an application start signal (corresponding to a kind of state signals) for starting the notification control application 300 is transmitted from the control device 200 to the smartphone 100 (S102).

When the smartphone 100 receives the application start signal, the notification control application 300 stored in the smartphone 100 starts (S103). It establishes communication connection between the self-defense tool 2 and the smartphone 100, and linkage connection is completed.

The lock control unit 401 of the use lock application 400 makes the high-voltage pulse generator 252 shifted to a temporal ON state (S104). In the temporal ON state, when the pulse button 231 is pressed, a pulse is output with output smaller than maximum output of the high-voltage pulse generator 252 from the high-voltage pulse generator 252. This operation mode will be called a low-output mode. The output time of pulses which can be output in the low-output mode is regulated within predetermined time. The temporal ON state is a state in which sound and light of pulse generation is generated by the press of the pulse button 231 but the strength of an impact to the human body by the pulses is decreased.

In the smartphone 100, after receipt of the application start signal, the biometric authentication unit 301 executes biometric authentication and performs authenticating process to see whether the user matches the registered user of the self-defense tool 2 preliminarily determined (S105). When the authentication is successful (S106), an authentication success signal is transmitted to the self-defense tool 2 (S107).

The self-defense tool 2 receives the authentication success signal and turns on the authentication positive flag 402, that is, rewrites the value from "0" to "1" (S108). Turn-on of the authentication positive flag 402 is one of the conditions to shift to the normal ON state.

Hereinafter, the smartphone 100 executes the biometric authentication process repeatedly in a predetermined period and repeatedly transmits the authentication success signal to the self-defense tool 2 (S109). On the other hand, the self-defense tool 2 measures lapse time since the authentication success signal is obtained and, when the next authentication success signal is not received within predetermined time, turns off the authentication positive flag 402, that is, rewrites the value from "1" to "0" (S110).

After the self-defense tool 2 enters the temporal ON state in step S104, when the pulse button 231 is pressed again (S111), the linkage monitoring unit 404 transmits a pulse ON signal (corresponding to a state signal) to the smartphone 100 each time the pulse button 231 is pressed (S112).

The condition monitoring unit 3031 of the smartphone 100 counts the predetermined number of times of the pulse ON signals or accumulation time of the pulse ON (S113). When the number of pulse-ON times or accumulation time becomes equal to or larger than a predetermined notification threshold value, the notification executing unit 3032 determines that the notification conditions are satisfied, sends a notification to the police, for example, a notification by calling 110, turns on the microphone 121, and transfers collected sounds (S114). The notification threshold may be set that the number of pulse on times is one, and accumulation time is regarded "don't care", so that a notification is started by pulse-on of once. When the threshold value is set to a plural number of times, notification at the time of improving a situation by force use in the temporal ON state is suppressed, and operation in a more cautious full function is suppressed. Transfer of sounds collected by the microphone 121 is a mode of notification of the ambient environment obtained by collecting the ambient environment of the smartphone 100 (in other words, "transmission of information expressing ambient environment"). Information expressing the ambient environment may be, other than sounds, a video image captured by at least one of the in-camera 111 and the out-camera 112, or position information measured by the GPS sensor 161.

When the notification is connected to the police and the smartphone 100 receives confirmation of a response to the notification such as "This is 110. Accident or case?" (S115), the notification executing unit 3032 transmits a connection confirmation signal to the self-defense tool 2 (S116).

When the self-defense tool 2 receives the connection confirmation signal, the lock control unit 401 turns on the connection confirmation flag 403 (S117). It makes both the authentication positive flag 402 and the connection confirmation flag 403 turn on, and the lock control unit 401 is shifted from the temporal ON state to the normal ON state (S118). At the shift from the temporal ON state to the normal ON state, in response to the press of the pulse button 231, the high-voltage pulse generator 252 generates a high-voltage pulse. The output of the high-voltage pulse at this time is larger than that in the low-output mode and can be increased to the maximum value of the pulse which can be output from the high-voltage pulse generator 252. This operation mode will be called a normal output mode.

When the notification response from the police is received in step S115, either the in-camera 111 or the out-camera 112 is activated to start recording of video images (S119). In the case of connection to a WEB system of the police, the video images are transferred to the WEB system. Sounds which are input from the microphone may be recorded and transferred to the WEB system. It can be also configured to transfer position information calculated by the GPS sensor 161 or the like to the WEB system every predetermined time or in accordance with movement of predetermined movement distance. The operation situation of the high-voltage pulse generator 252 may be collected and periodically transferred.

When the linkage between the self-defense tool 2 and the smartphone 100 is terminated forcibly (S120), the linkage monitoring unit 404 transmits a forced termination signal to the smartphone 100 (S121). The case where linkage is forcibly terminated is not a state of normal termination which is executed together with biometric authentication success by the smartphone 100 but the case where the termination operation is performed on the self-defense tool 2 side. For instance, it corresponds to a linkage impossible state such as the case where the power button 230 of the self-defense tool 2 is off, the connection to the smartphone 100 is cancelled, or the self-defense tool 2 is broken.

When the forced termination signal is received, the linkage cancellation unit 304 of the smartphone 100 makes the smartphone 100 shifted to a virtual power-off mode (S122). The "virtual power-off mode" is a state that, although the notification to the police by the smartphone 100 continues, sound output from the smartphone 100, vibration output, and display output are stopped so that the smartphone 100 seems not functioning but actually the input function, the talking function, and the communication function of the out-camera 112, the in-camera 111, and the microphone 121 are maintained. The processes from step S120 to S122 are performed only in the case where the forced termination signal is transmitted and received.

In the smartphone 100, when the normal termination operation is performed (S123), for example, when the end button displayed in the display 102 is tapped, the biometric authentication unit 301 executes the biometric authentication process (S124). When the biometric authentication succeeds (S125), the normal termination signal is transmitted from the linkage cancellation unit 304 to the self-defense tool 2 (S126). When the normal termination signal is received, the linkage monitoring unit 404 of the self-defense tool 2 turns off the authentication positive flag 402 and the connection confirmation flag 403 and turns off the main power of the self-defense tool 2 (S127).

According to the embodiment, the operation state of the self-defense tool 2 is divided into the low-output mode (temporal ON state) and the normal output mode (normal ON state) in accordance with the presence/absence of restriction of the pulse output and, when there is no connection to police notification by the portable communication device, use in the normal output mode is inhibited. In such a manner, abuse of the self-defense tool 2 can be suppressed. In order to make the self-defense tool 2 such as a pulse generation device which gives an impact to a human body function, a notification is sent to the police. Consequently, abuse other than the self-defense purpose of the self-defense tool 2 can be prevented.

On the other hand, the self-defense tool 2 enters the temporal ON state only by the biometric authentication and a notification to the police is not requested, so that a motion check by a low output can be performed without sending a notification to the police. In addition, when the pulse button 231 is pressed once by mistake, an emergency call is not made, so that an erroneous notification to the police can be suppressed.

Further, even in the case where the self-defense tool 2 is robbed by another person, the authentication fails in the biometric authentication process which is repeated every predetermined period by the portable notification device. In such a manner, use by another person of the self-defense tool 2 can be inhibited.

In the case where the linkage between the self-defense tool 2 and the portable notification device is forcibly terminated, the portable notification device shifts to the virtual power-off mode. Consequently, the notification to the police can be maintained while hiding that the notification to the police is kept connected from another person. In such a manner, disconnection of the notification to the police by another person can be avoided.

Although a stun gun using the high-voltage pulse generator 252 is used as the self-defense tool 2 in the foregoing embodiment, as another example of the self-defense tool 2, a tear gas spray may be used. In this case, it may be configured that a member which controls press of an ejection button of a tear gas spray is attached to a spray can, only ejection of a small amount is allowed in a temporal ON state, a normal ON state is set by lock cancellation from the portable notification device, and ejection can be performed interlockingly with the press of the ejection button.

Modification of First Embodiment

Figure 7:
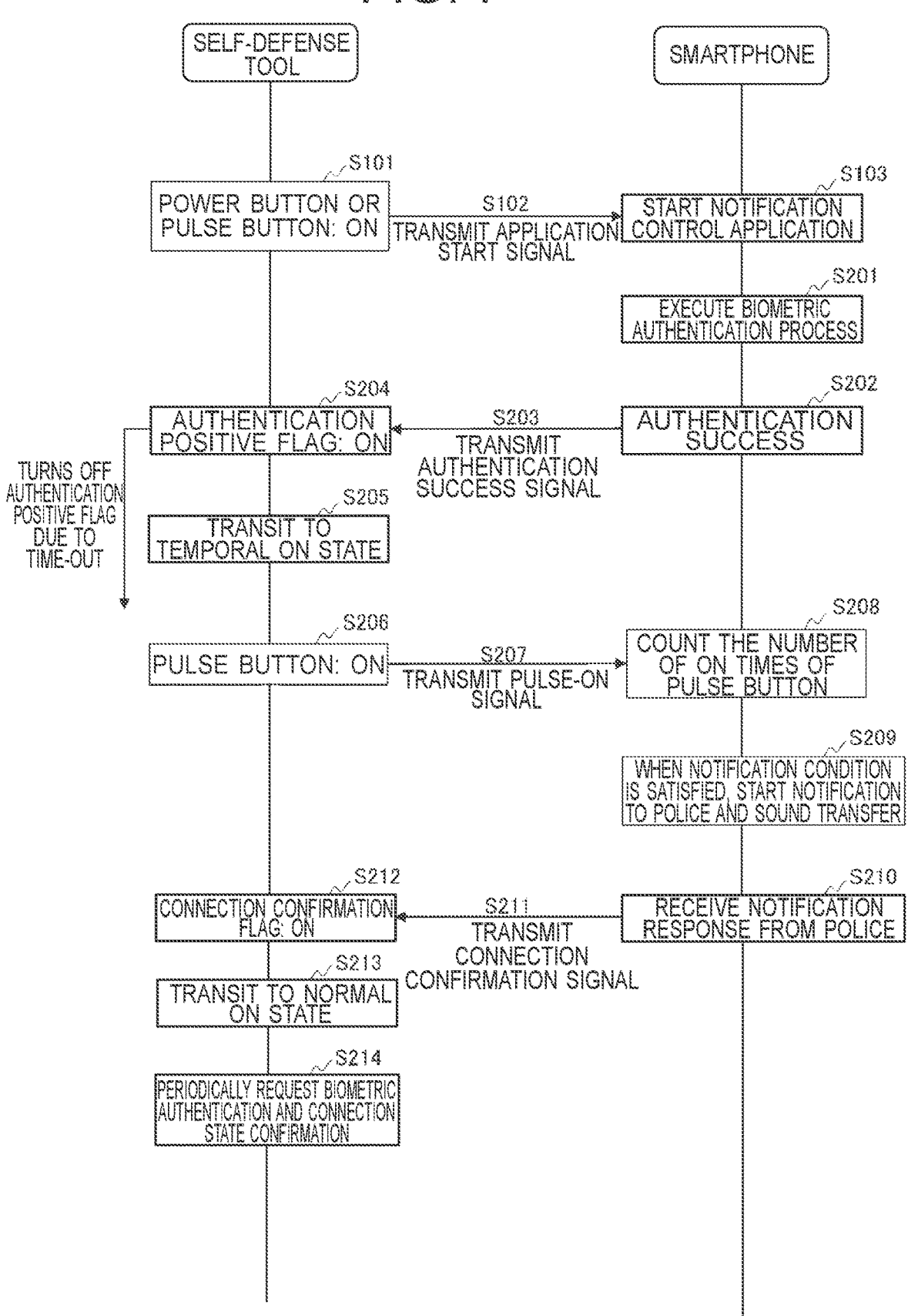
FIG. 7 is a sequence diagram illustrating the flow of control of a linked notification system according to a modification of the first embodiment.

This embodiment is a modification of the first embodiment. A biometric authentication process is requested from the self-defense tool 2 to the portable notification device. FIG. 7 is a sequence diagram illustrating the flow of control of a linked notification system 1b according to a modification of the first embodiment. Hereinafter, only processes different from FIG. 6 will be described.

When the notification control application of the smartphone 100 starts (S103), the smartphone 100 executes the biometric authentication process (S201). When the biometric authentication succeeds (S202), the smartphone 100 sends an authentication success signal indicating an authentication result success to the self-defense tool 2 (S203).

On receipt of the authentication success signal, the self-defense tool 2 turns on the authentication positive flag 402 (S204) and shifts to the temporal ON state (S205).

In the temporal ON state, when the pulse button 231 is pressed (S206), a pulse is generated. The self-defense tool 2 transmits a pulse-on signal to smartphone 100 (S207).

The smartphone 100 counts predetermined number of pulse-on times or predetermined accumulation time of pulse-on on the basis of the pulse-on signals (S208) and, when it is determined that the notification condition is satisfied, sends a notification to the police (S209). When the smartphone 100 confirms connection of the notification to the police and, when a response to the notification is confirmed (S210), transmits a connection confirmation signal to the self-defense tool 2 (S211). The "connection confirmation signal" is an instruction to cancel function suppression using a notification as a precondition in accordance with notification execution. On receipt of the connection confirmation signal from the smartphone 100, the self-defense tool 2 as an external device cancels the function suppression using a notification as a precondition.

When the self-defense tool 2 receives the connection confirmation signal, it turns on the connection confirmation flag (S212). It makes the temporal ON state shifted to the normal ON state (S213). In the normal ON state, when the pulse button 231 is pressed, the high-voltage pulse generator 252 generates a high-voltage pulse.

Hereinafter, the biometric authentication and confirmation of the connection state are periodically requested (S214). When the validity time of the biometric authentication signal (biometric authentication request period) is expired, the authentication positive flag 402 is turned off. Similarly, when the validity time of the connection confirmation signal (connection state confirmation period) is expired, the connection confirmation flag 403 is turned off, and the linkage connection is cancelled.

Regarding the biometric authentication request period and the connection state confirmation period, it is preferable that the "biometric authentication request period" is set to be longer than the connection state confirmation period. In such a manner, when an operation for the biometric authentication on the smartphone 100 side is necessary, the interval since the biometric authentication is performed once until the biometric authentication is performed next can be made longer, so that the usability at the time of emergency can be improved.

Since the processes after receipt of a response to the notification from the police, that is, video recording, shift to the virtual power-off mode, and the normal termination process are similar to those in the first embodiment, the description will not be repeated.

This modification can also produce effects similar to those of the first embodiment.

Second Embodiment

A second embodiment is an embodiment in which an external device and a portable notification device are linked and, when a notification condition which is set for each of external devices is satisfied, a notification is sent from the portable notification device to a specified party. The number of external devices to be linked may be one or plural.

For example, in a house, there are a plurality of external devices such as a refrigerator, a rice cooker, a pot, and a lighting device. Not many of them are connected to the Internet by themselves. Although they may be connected to the Internet because of spread of the IoT technology in future, it is difficult to perform usage of the devices and notification to a specified party in accordance with the intention of the user. The devices do not have a function of calling to a telephone line network such as 4G, 5G, and LTE.

In the embodiment, the notification function of the portable notification device represented by the smartphone 100 is shared by external devices.

The first embodiment relates to the case where the number of the external devices in the second embodiment is one, the notification condition is "the number of pulse-on times or predetermined accumulation time", and the notification destination is "police", and corresponds to a mode of the second embodiment.

Figure 8:
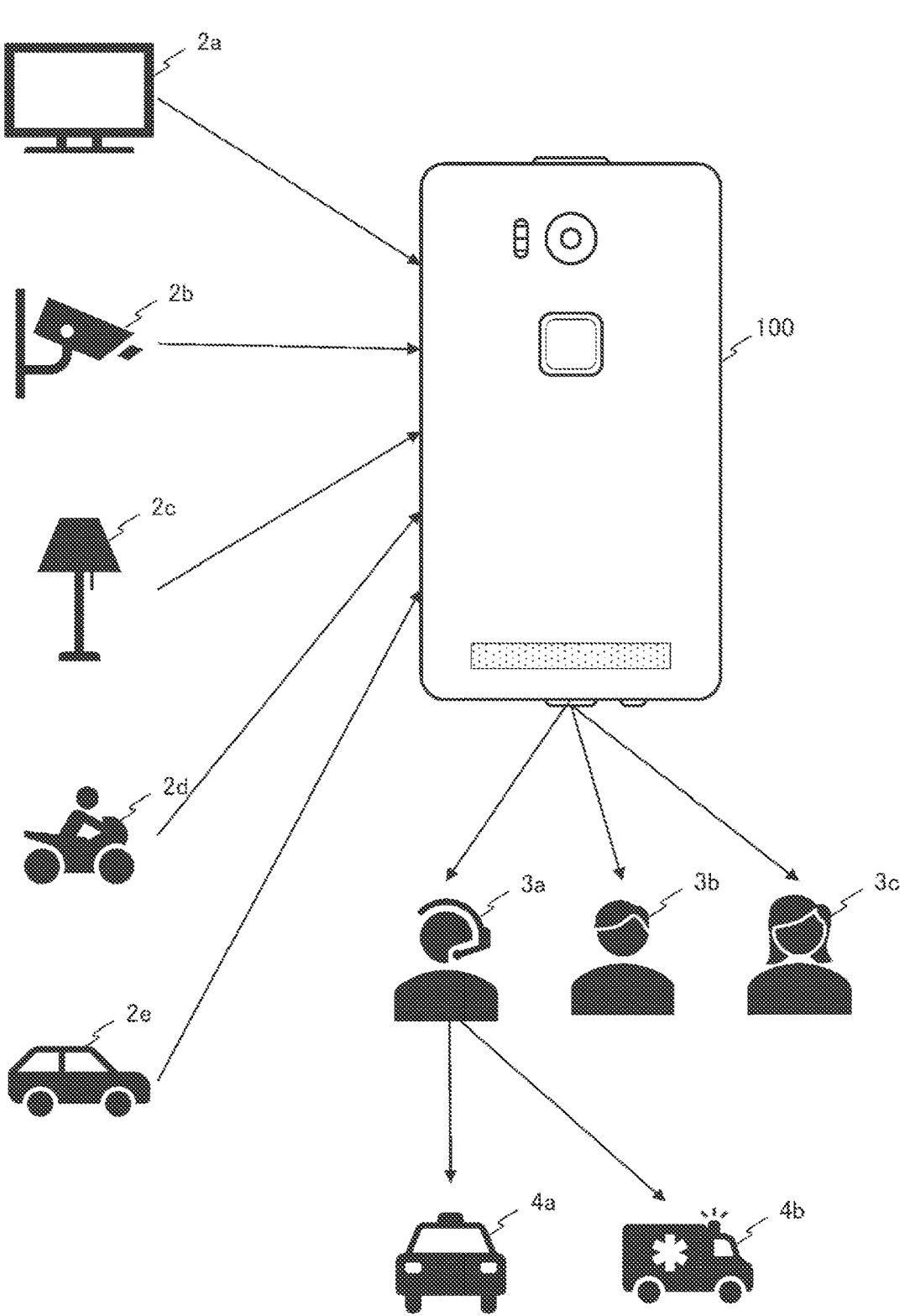
FIG. 8 is a schematic configuration diagram of a linked notification system according to a second embodiment.

FIG. 8 is a schematic configuration diagram of the linked notification system 1*b* according to the second embodiment.

The linked notification system 1*b* is configured by connecting at least one external device as an electronic device, for example, a television 2*a*, a surveillance camera 2*b*, a lighting device 2*c* and, in addition, an electronic device mounted in vehicles such as a bike 2*d* and a car 2*e* (a drive recorder, an ECU, a door, an engine, a car navigation system, or the like) and the smartphone 100 as the portable notification device in a wired or wireless communication manner. Examples of the electronic device are not limited to the above devices but may be a refrigerator, a microwave, an electromagnetic cooking device, a gas alarm, a personal computer, another smartphone, a smart watch, a tablet, and a charger. It is assumed that, when the smartphone 100 is connected to, for example, a home network, the smartphone 100 can recognize an external device connected to the home network. It is also assumed that, when connected to an in-vehicle network (CAN), an external device connected to the CAN is seen selectable.

The smartphone 100 preliminarily stores data defining a notification condition and a notification destination for each of external devices. When it is determined that a notification condition based on data received from an external device is satisfied, a notification is sent to a predetermined notification destination, for example, a communication center 3*a* of a police 4*a* or a fire department 4*b*, a family member 3*b*, or a care worker 3*c*.

FIG. 9 illustrates the notification control table 500 stored in the smartphone 100 in the second embodiment. The notification control table 500 is stored in the nonvolatile memory 105 (refer to FIG. 2). The notification control table 500 is a mode of the notification control information, and the data structure is not limited to a table.

In the notification control table 500, "external device 1" and "external device 2" as a plurality of external devices to which the smartphone 100 is connected, a state of "sensor 1" mounted on the external device 1, a state of "sensor 2" mounted on the external device 2, a notification condition defining the relation of the state of the external device 1 and the state of the external device 2 by the AND condition or the OR condition, and "notification destination" and its "content" of a notification sent by the smartphone 100 and "additional information" including the details such as a notification timing are stored so as to be associated.

In pattern 1 in the notification control table 500, when "sensor 1" becomes "threshold or larger" and "external device 2" becomes "state A" (the sensor output of the sensor 2 is not considered, that is, regardless of the sensor output of the sensor 2) in a state where "external device 1" is in "state 1", the content "x" is informed to the notification destination "A". In the pattern 1, by a combination of the external devices 1 and 2, a notification condition is set.

In pattern 2, when "external device 1" is in "state 1", "external device 2" is in "state B", and "sensor 2" is "threshold or larger", content "x" is notified to the notification destination "B". Also in the pattern 2, a notification condition is set by a combination of the external devices 1 and 2.

In pattern 3, "sensor 1" is "threshold or larger" when "external device 1" is in "state 2", and "sensor 2" is "threshold or larger" when "external device 2" is in "state A", so that content "y" is notified to the notification destination "C". Also in the pattern 3, a notification condition is set by a combination of the external devices 1 and 2.

In pattern 4, when "external device 1" is in "state 2" and "external device 2" is in "state C", content "y" is notified to notification destination "A". Also in the pattern 4, a notification condition is set by a combination of the external devices 1 and 2.

In pattern 5, when "sensor 1" is "threshold or larger" regardless of the state of "external device 1" and "sensor 2" is "threshold or larger" regardless of the state of "external device 2", content "x" is notified to notification destination "B". Also in the pattern 5, a notification condition is set by a combination of the external devices 1 and 2.

Figure 10:
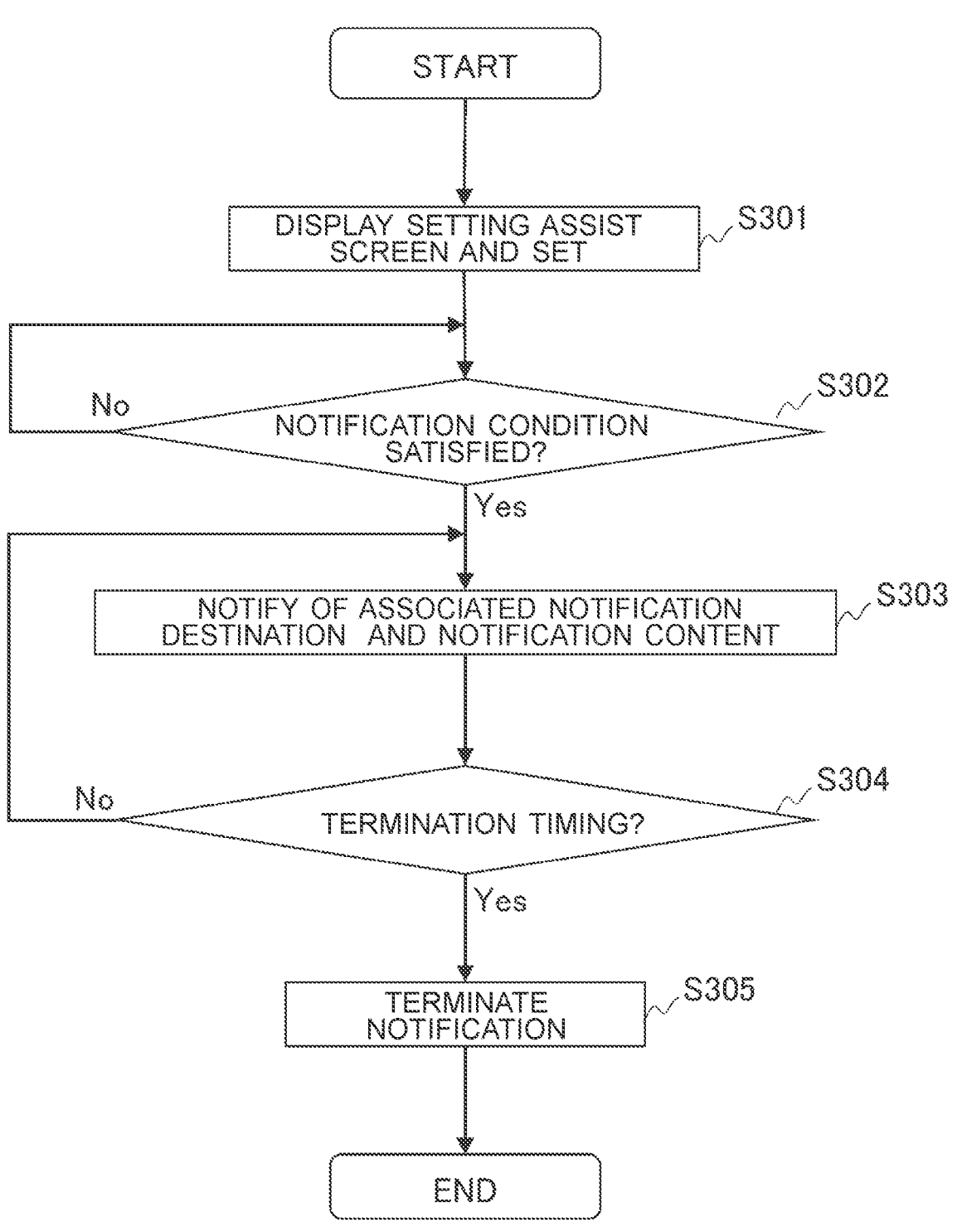
FIG. 10 is a flowchart illustrating the flow of processes performing a setting of linkage with an external device by a smartphone.

FIG. 10 illustrates the flow of processes of performing a linkage setting with an external device by the smartphone 100.

The setting guide unit 305 displays a setting assist screen on the display 102 to nudge the user for input and registers entered content (S301).

Figure 11:
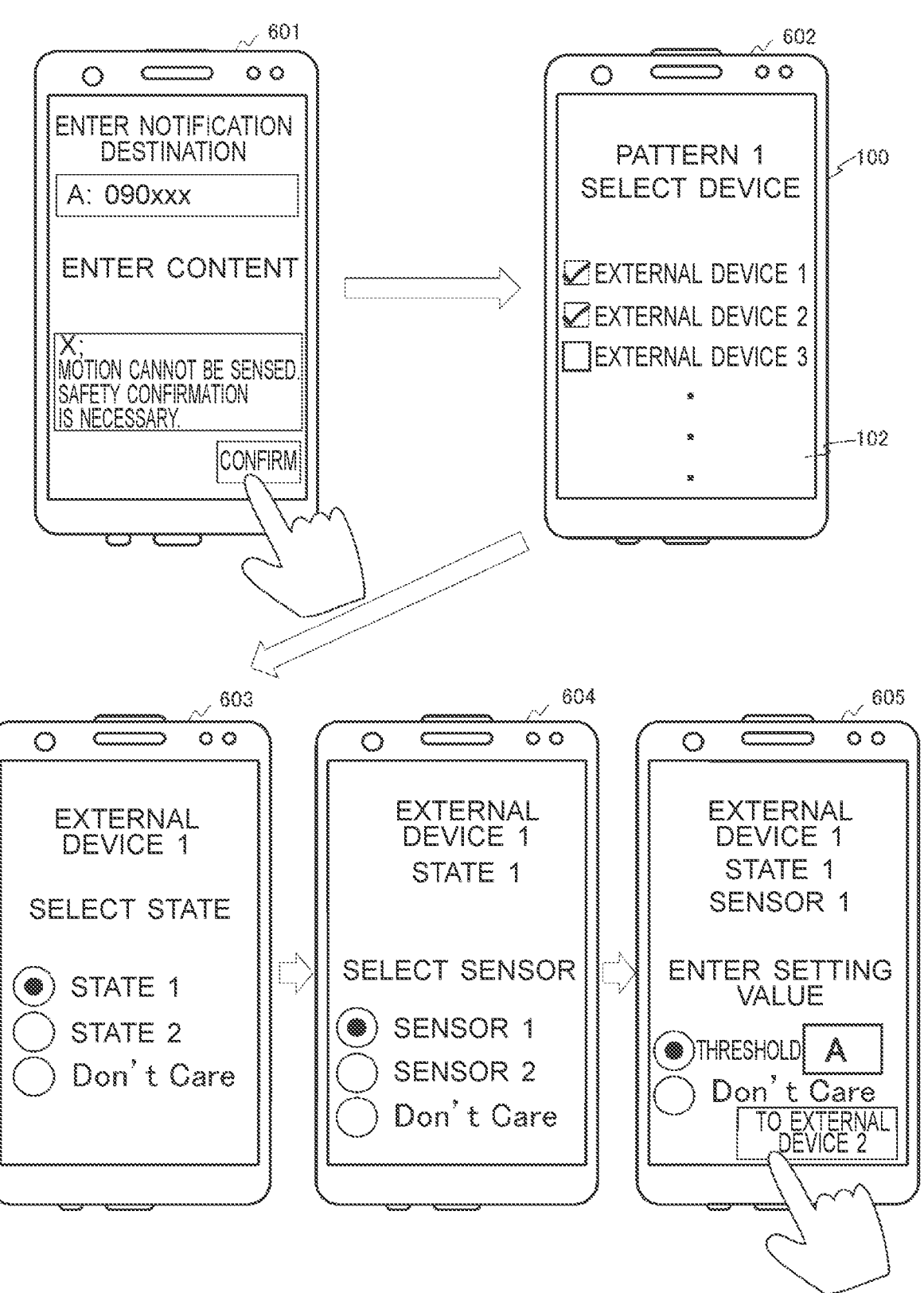
FIG. 11 is a diagram illustrating an example of a setting assist screen.
Figure 12:
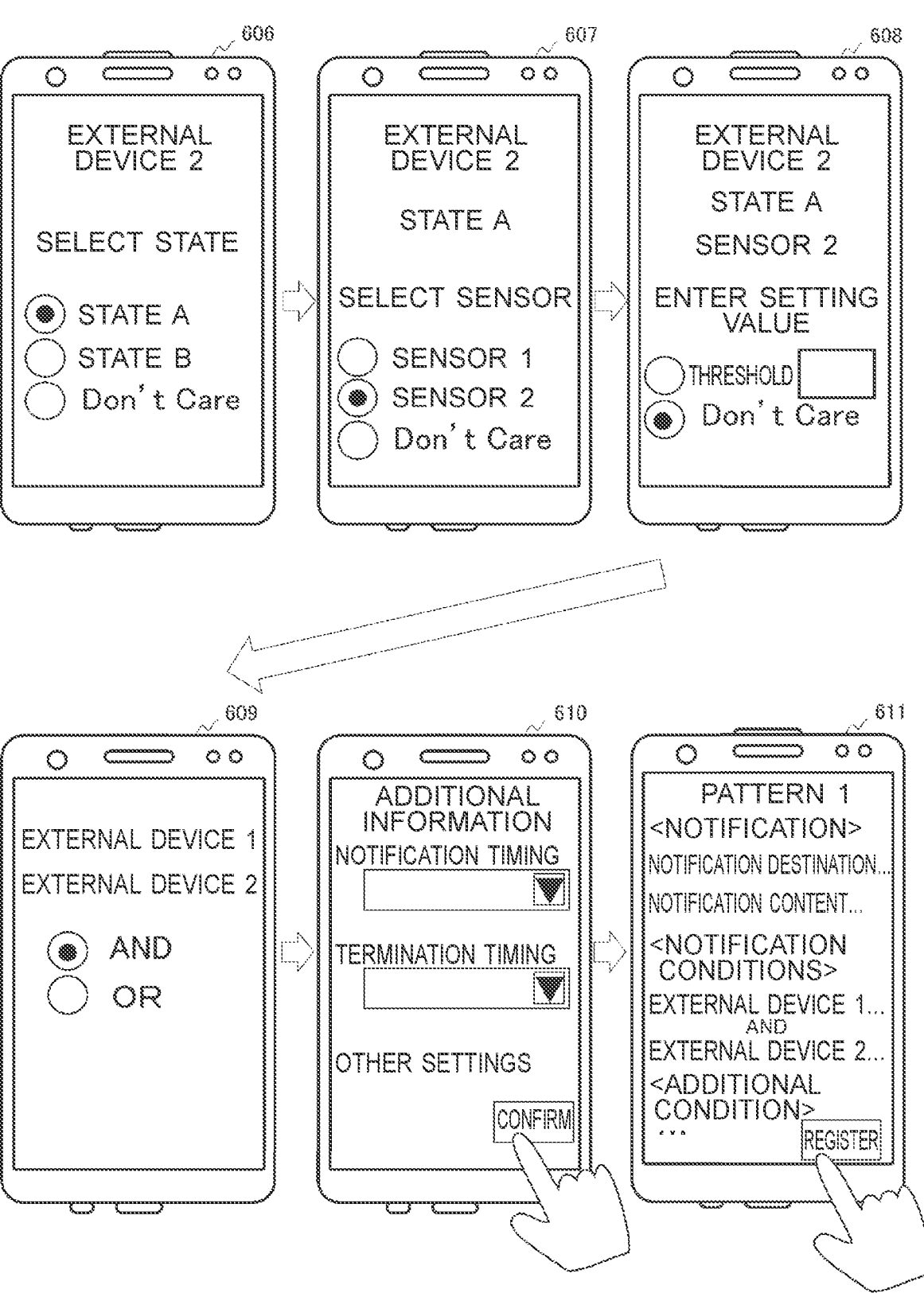
FIG. 12 is a diagram illustrating an example of the setting assist screen.

FIGS. 11 and 12 illustrate an example of the setting assist screen. Referring to FIGS. 11 and 12, a registration example of the pattern 1 in the notification control table 500 of FIG. 10 will be described.

First, in a notification destination input screen 601, a notification destination and notification content are entered. By the entry, an operation of editing the notification control table 500 is performed. The notification destination may be a telephone number, a mail address, or an account of SNS.

Subsequently, in a notification condition input screen 602, entry of a notification condition is nudged. For example, a list of external devices connected to a household LAN is displayed in the smartphone 100, and at least one of the external devices to be used as a notification condition is allowed to be selected. In the example of FIG. 11, two devices of the external devices 1 and 2 are selected by marking the checkboxes.

In a notification condition input screen 603, the state of the external device 1 is entered. In a notification condition input screen 604, a sensor kind is entered. In a notification condition input screen 605, a setting value of the sensor is entered. After that, the process shifts to a setting of details of the external device 2.

In a notification condition input screen 606, the state of the external device 2 is entered. In a notification condition input screen 607, a sensor kind is entered. In a notification condition input screen 608, a setting value of the sensor is entered. After that, in a notification condition input screen 609, the AND condition or the OR condition is entered for the conditions defined in the external devices 1 and 2.

In an additional condition input screen 610, as "notification timing", for example, "immediately when conditions are satisfied", "after condition continues N minutes", "after n minutes since condition is satisfied" or the like is selected from a pull-down menu. As "termination timing", for example, "termination after notification is sent once", "termination after periodical notification of N times or n minutes", "periodic notification until transmission termination instruction is entered", "periodic notification until power is turned off", or the like is selected from a pull-down menu. When "other settings" is selected, a notification destination can be added and properties (kind, display name, and the like) of a notification destination can be set.

When the "confirm" button in the additional condition input screen 610 is tapped, input information is displayed in a confirmation screen 611. When "register button" is tapped, the information of the pattern 1 is written in the notification control table 500 stored in the setting storage unit 302.

The condition monitoring unit 3031 refers to the notification control table 500 and reads a notification condition defined by using information of the states of the external devices set in each pattern and information from the sensors. When an event occurs on the side of an external device, various signals are received from the external device, and whether the notification condition is satisfied or not is determined on the basis of the signals received (S302).

When the condition monitoring unit 3031 determines that the notification condition is satisfied (Yes in S302), the notification executing unit 3032 notifies a notification destination and notification content associated with the notification condition (S303). At this time, the additional information of the pattern is also referred to, and a notification is sent according to the notification condition specified in the additional information.

On the other hand, when the condition monitoring unit 3031 determines that the notification condition is not satisfied (No in S302), waiting continues until the notification condition is satisfied.

The notification executing unit 3032 refers to the additional information and continues notification until a termination timing specified in the additional information is reached (No in S304) and, when the termination timing is reached (Yes in S304), terminates the notification (S305).

According to the embodiment, a notification condition using the state and a value of a sensor is defined for each of external devices, and a notification destination and notification content can be set in association with the notification condition, so that notification adapted to the situation of the user can be performed.

Particularly, in the embodiment, a notification condition can be specified by combining states of a plurality of external devices. When a portable notification device sends a notification on the basis of the state of a single external device, there is the possibility that an erroneous notification is given if the external device has operation failure. However, since a notification condition can be set by combining a plurality of external devices, an erroneous notification due to operation failure can be suppressed.

The present invention is not limited by the foregoing embodiments and includes design modifications which are not departing from the gist of the present invention.

For example, in the case of using the present invention as a linked notification system which monitors an intruder entering an empty home and sends a notification, a notification condition may be set by properly combining, as external devices, a human detecting sensor, a light device, a monitoring camera, a microphone input of an AI speaker in the house.

In the case of using the present invention as a linked notification system sensing danger when the user drives a vehicle or rides on a vehicle and sending a notification, a portable notification device is linked to an in-vehicle system, or a car navigation system and Bluetooth (registered trademark). As a notification condition, the value of a sensor output of an acceleration sensor and position information of the portable notification device are combined. When the value of the acceleration sensor changes suddenly and the position information of the portable notification device becomes unchanged, notification may be executed.

Further, by adding a change in the position information as a notification condition, a notification is not sent when it is assumed that the user moves by holding the portable notification device by hand, but a notification can be sent from the portable notification device to the police in the situation that the user is unconscious or cannot move.

Simultaneously, position information, sound information, camera information, and temperature information (fire) may be continuously transmitted until the termination timing.

Further, when a large impact sound to the degree that a door or window is banged is detected in cooperation with the portable notification device by using the in-vehicle system, the car navigation, and the Bluetooth (registered trademark), a notification can be sent to the police. At this time, the position information, a video image captured by a camera, and sound information may be continuously transmitted. In such a manner, safety in a situation that the driver is alone, faces danger, and cannot send a notification by himself/herself can be supported.

The present invention may be also used as a linked notification system for safety and crime prevention when the user is outside, and for detecting a danger situation and sending a notification. In this case, characteristics of voice (voiceprint) of the user registered in advance are stored as information used for biometric authentication, and predetermined keywords such as "help", "ouch", and "yipe" are set as a notification condition. After starting linkage, the microphone 121 starts collecting sounds and outputs voice information to the biometric authentication unit 301 and the condition monitoring unit 3031.

The biometric authentication unit 301 analyzes the frequency of the voice information, determines match with the characteristics of the voice of the user registered and, when there is a match, determines that the authentication succeeds.

The condition monitoring unit 3031 converts the voice information to text data and executes language analyzing process on the text data. The condition monitoring unit 3031 determines a match between the text data and a predetermined keyword. When a match is determined, the notification executing unit 3032 sends a notification.

It may be also configured that, as the additional condition, "search for an acquaintance registered in an address book" in the smartphone 100 can be added to a notification destination. The notification executing unit 3032 may compare, in addition to a notification destination which is always registered as a notification destination regardless of the present position, position information detected by the GPS sensor 161 with the addresses of acquaintances registered in an address book (address data), and send a notification to the acquaintance whose address is the closest among the acquaintances registered in the address book. By dynamically selecting a notification destination in accordance with the present position as described above, the user can get help sooner.

A notification may be given only by a keyword for notification registered in advance by the user. In this case as well, in a manner similar to the above, a notification destination may be dynamically selected from an address book, and a notification may be sent.

When the touch panel 107 detects that the user touches the display 102 of the smartphone 100, combination of the touch detection and detection of voice of a specific keyword may be set as a notification condition. It can prevent erroneous transmission.

Further, a function of setting a notification condition by the smartphone 100 itself without linking to an external device may be added. For example, for the purpose of assisting prevention of loss of the smartphone 100, before the power of the smartphone 100 is exhausted, for example, the state of an internal battery is sensed and, before the battery is shut down, position information of the smartphone 100 may be notified to a specified destination, for example, a WEB mail address or an SNS account used by the user. At that time, in place of the position information, or in addition to the position information, images captured by the in-camera 111 and the out-camera 112 of the smartphone 100 and voice information collected by the microphone 121 immediately before shutdown may be added.

For the purpose of breakage prevention, a notification may be given when the ambient temperature or ambient humidity of the smartphone 100 becomes higher than the setting. Consequently, device breakage of the smartphone 100 and danger of the user can be notified.

DESCRIPTION OF REFERENCE NUMERALS

1*a*, 1*b* linked notification system
2*a* television
2*b* surveillance camera
2*c* lighting device
2*d* bike
2*e* car
3 pattern
3*a* communication center
3*b* family member
3*c* care worker
4 pattern
4*a* police
4*b* fire department
5 pattern
100 smartphone
101 processor
102 display
103 ROM
104 RAM
105 nonvolatile memory
106 bus
107 touch panel
108 casing
111 in-camera
112 out-camera
121 microphone
122 speaker
130 operation button
141 wireless LAN communication device
142 proximity wireless communication device
143 telephone network communication device
150 vibrator
160 sensor group
161 GPS sensor
162 gyroscope sensor
163 geomagnetic sensor
164 acceleration sensor
165 illuminance sensor
166 proximity sensor
167 distance sensor
168 line-of-sight detection sensor
170 timer

180 connector
200 control device
201 processor
202 bus
203 ROM
204 RAM
205 display
230 power button
231 pulse button
241 wireless communication device
242 wired communication device
251 battery
252 high-voltage pulse generator
280 connector
300 notification control application
301 biometric authentication unit
302 setting storage unit
303 notification control unit
3031 condition monitoring unit
3032 notification executing unit
304 linkage cancellation unit
305 setting guide unit
400 use lock application
401 lock control unit
402 authentication positive flag
403 connection confirmation flag
404 linkage monitoring unit
500 notification control table
601 notification destination input screen
602, 603, 604, 605, 606, 607, 608, 609 notification destination input screen
610 additional condition input screen
611 confirmation screen

What is claimed is:

1. A linked notification system configured by communication-connecting at least one external device to a portable notification device, wherein the portable notification device is configured to comprise a first processor, a nonvolatile memory, a first communication device performing communication with the at least one external device, and a notification device sending a notification to a predetermined notification destination, each of the at least one external device is configured to have a second communication device performing communication with the portable notification device, the nonvolatile memory is configured to store notification control information in which a notification destination is associated with a notification condition defined by using a state of the at least one external device, and the first processor, upon receipt of a state signal indicating the state of the at least one external device from the at least one external device, is configured to:

refer to the notification control information, determine whether the notification condition is satisfied or not on a basis of the state signal, when it is determined that the notification condition is satisfied, execute control for sending the notification to the notification destination associated with the notification condition, and wherein the at least one external device is a self-defense tool, the self-defense tool is configured to include a second processor, a high-voltage pulse generator, and a pulse button that, upon being pressed, causes a high-voltage pulse output from the high-voltage pulse generator, the notification control information is configured to include the notification condition defined by using operation of the pulse button, and the second processor is configured to output the state signal indicating that the pulse button is operated to the portable notification device.

2. The linked notification system according to claim 1, wherein the first processor is configured to:

execute the control for sending the notification on the notification device and, after that, notify the notification destination of information expressing ambient environment of the portable notification device collected by the portable notification device.

3. The linked notification system according to claim 2, wherein information expressing the ambient environment is configured to include any of video image information, sound information, and position information.

4. The linked notification system according to claim 2, wherein one of the at least one external device is configured to:

operate in a state where a function of the one external device is suppressed before the notification execution by the portable notification device and, according to the notification execution, cancel the function suppression using the notification as a precondition.

5. The linked notification system according to claim 1, wherein the self-defense tool is configured to have operation modes: a low-output mode in which the output from the high-voltage pulse generator is restricted; and a normal output mode in which the restriction is cancelled, when the self-defense tool activates, the second processor sets the operation mode of the high-voltage pulse generator to the low-output mode, the first processor is configured to:

execute a biometric authentication process to a user of the self-defense tool, when the biometric authentication process succeeds, transmits an authentication success signal indicating success of the biometric authentication process to the self-defense tool, upon a notification response being received from the notification destination, transmit a connection confirmation signal indicating that a connection to the notification destination is confirmed to the self-defense tool, and the second processor is configured to switch, in the case where the authentication success signal and the connection confirmation signal are received, the operation mode of the high-voltage pulse generator from the low-output mode to the normal output mode.

6. The linked notification system according to claim 5, wherein the portable notification device is configured to include a display and a speaker, and the first processor is configured to:

execute the biometric authentication process on receipt of operation of terminating communication connection to the self-defense tool, when biometric authentication succeeds, transmit a normal termination signal to the self-defense tool, and upon a forced termination signal indicating that maintenance of communication connection to the portable notification device is impossible is received from the second processor, stop display of the display and voice output from the speaker while maintaining the communication connection to the portable notification device and the notification destination.

7. A portable communication device which can be communication-connected to at least one external device, comprising:

a first processor, a nonvolatile memory, a first communication device performing communication with the at least one external device, and a notification device sending a notification to a predetermined notification destination, the nonvolatile memory is configured to store notification control information in which a notification destination is associated with a notification condition defined by using a state of the at least one external device, and the first processor, upon receipt of a state signal indicating a state of the at least one external device from the at least one external device, is configured to:

refer to the notification control information, determine whether the notification condition is satisfied or not on a basis of the state signal, and when it is determined that the notification condition is satisfied, execute control for sending the notification to the notification destination associated with the notification condition, wherein the first processor is configured to:

execute the control for sending the notification and, after that, notify the notification destination of information expressing an ambient environment of the portable communication device collected by the portable communication device, and transmit an instruction for cancelling function suppression using the notification as a precondition in accordance with the notification execution to the at least one external device.

8. The portable communication device according to claim 7, wherein the information expressing the ambient environment is configured to include any of a-video image information, sound information, and position information.

9. The portable communication device according to claim 7, further comprising a position sensor, wherein the nonvolatile memory is configured to store address data including at least one contact, and the first processor is configured to:

obtain position information from the position sensor when it is determined that the notification condition is satisfied, retrieve a contact of a person in a point closest to the position information from the address data, and execute control for sending the notification to the retrieved contact.

10. The portable communication device according to claim 7, wherein when an operation of editing the notification condition and the notification destination in the notification control information is received, the first processor is configured to update the notification control information stored in the nonvolatile memory in accordance with the editing operation.

11. A linked notification method for a portable communication device having a processor, the portable communication device being communication-connected to at least one external device, the method being performed by the processor of the portable communication device, comprising:

receiving a state signal indicating a state of the at least one external device;

referring to notification control information in which a notification destination is associated with a notification condition defined by using a state of the at least one external device, on a basis of the state signal, determining whether the notification condition is satisfied or not, and when it is determined that the notification condition is satisfied, sending the notification to the notification destination associated with the notification condition, executing the control for sending the notification and, after that, notifying the notification destination of information expressing an ambient environment of the portable communication device collected by the portable communication device, and transmitting an instruction for cancelling function suppression using the notification as a precondition in accordance with the notification execution to the at least one external device.

12. The linked notification method according to claim 11, wherein the information expressing the ambient environment includes any of video image information, sound information, and position information.

13. The linked notification method according to claim 11, further including:

storing address data in nonvolatile memory including at least one contact, obtaining position information from the position sensor when it is determined that the notification condition is satisfied, retrieving a contact of a person in a point closest to the position information from the address data, and executing control for sending the notification to the retrieved contact.

14. The linked notification method according to claim 11, wherein when an operation of editing the notification condition and the notification destination in the notification control information is received, the notification control information is updated and stored in nonvolatile memory in accordance with the editing operation.

\* \* \* \* \*